US 8,006,298 B1

(12) United States Patent
Balasubramanian et al.

(10) Patent No.: US 8,006,298 B1
(45) Date of Patent: Aug. 23, 2011

(54) FRAUD DETECTION SYSTEM AND METHOD (75) Inventors: Balagurunathan Balasubramanian, Irving, TX (US); Rudi Himawan, Grand Prairie, TX (US); Bharath N. Kuruvalli, Irving, TX (US); Richard R. Perez, Euless, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 1383 days.

(21) Appl. No.: 11/484,420

(22) Filed: Jul. 11, 2006

(51) Int. Cl.
*G06F 7/04* (2006.01)
*G06F 12/00* (2006.01)
*G06F 12/14* (2006.01)
*G06F 13/00* (2006.01)
*G06F 17/30* (2006.01)
*G11C 7/00* (2006.01)

(52) U.S. Cl. ............... 726/18; 726/17; 726/26; 726/27; 726/28

(58) Field of Classification Search .................. 713/159; 726/17, 18, 26–28
See application file for complete search history.

(56) References Cited

U.S. PATENT DOCUMENTS

| 5,293,488 | A | 3/1994 | Riley et al. |
| 5,659,547 | A | 8/1997 | Scarr et al. |
| 5,742,668 | A | 4/1998 | Pepe et al. |
| 5,742,905 | A | 4/1998 | Pepe et al. |
| 5,991,882 | A * | 11/1999 | O'Connell ...................... 726/18 |
| 6,009,177 | A | 12/1999 | Sudia |
| 6,205,478 | B1 * | 3/2001 | Sugano et al. ................ 709/223 |
| 6,240,512 | B1 | 5/2001 | Fang et al. |
| 6,321,334 | B1 | 11/2001 | Jerger et al. |
| 6,471,486 | B1 * | 10/2002 | Centers et al. .................. 417/18 |
| 6,519,647 | B1 | 2/2003 | Howard et al. |
| 6,609,115 | B1 | 8/2003 | Mehring et al. |
| 6,836,799 | B1 | 12/2004 | Philyaw et al. |
| 6,898,577 | B1 | 5/2005 | Johnson |
| 7,016,875 | B1 | 3/2006 | Steele et al. |
| 7,089,585 | B1 | 8/2006 | Dharmarajan |
| 7,155,614 | B2 * | 12/2006 | Ellmore ......................... 713/183 |
| 7,194,764 | B2 | 3/2007 | Martherus et al. |
| 7,251,732 | B2 * | 7/2007 | Jamieson et al. ............. 713/182 |
| 7,260,581 | B1 * | 8/2007 | Cimini et al. .................... 714/48 |
| 7,260,838 | B2 * | 8/2007 | Bones et al. ...................... 726/8 |
| 7,350,229 | B1 | 3/2008 | Lander |
| 7,428,750 | B1 * | 9/2008 | Dunn et al. ...................... 726/8 |
| 7,496,756 | B2 * | 2/2009 | Oka et al. ...................... 713/175 |

(Continued)

OTHER PUBLICATIONS

Citrix Systems, Citrix MetaFrame Password Manager, Apr. 22, 2004, (1 pg.).

(Continued)

*Primary Examiner* — Christian LaForgia
*Assistant Examiner* — James Turchen (57) ABSTRACT

A computer implemented method is provided for detecting potential fraud or unauthorized activity when resetting an application password in an application in which a computer system including a call center dashboard system and a fraud detection interface. The method includes the steps of initiating the resetting of a user's application password for an application. The method further includes the steps of determining when an application ID is duplicated in the call center dashboard data store for the application and preparing an error report when the application ID is duplicated in the data store. The method also includes the steps of submitting a reset password for the application using the password criteria of the application. The method further includes the steps of storing the reset password in the user profile of the user when the application ID is not duplicated and the password conforms to the password criteria.

20 Claims, 5 Drawing Sheets

U.S. PATENT DOCUMENTS

| | | | |
|---|---|---|---|
| 7,496,954 B1* | 2/2009 | Himawan et al. | 726/8 |
| 7,503,065 B1* | 3/2009 | Packingham et al. | 726/12 |
| 7,636,852 B1 | 12/2009 | Balasubramanian et al. | |
| 7,639,794 B2* | 12/2009 | Iwatsu et al. | 379/355.07 |
| 2002/0091639 A1 | 7/2002 | Mandahl et al. | |
| 2003/0120593 A1 | 6/2003 | Bansal et al. | |
| 2003/0154403 A1* | 8/2003 | Keinsley et al. | 713/201 |
| 2004/0034594 A1 | 2/2004 | Thomas et al. | |
| 2004/0117386 A1 | 6/2004 | Lavender et al. | |
| 2004/0148565 A1 | 7/2004 | Davis et al. | |
| 2004/0260942 A1 | 12/2004 | Jamieson et al. | |
| 2005/0198501 A1* | 9/2005 | Andreev et al. | 713/168 |
| 2006/0075224 A1* | 4/2006 | Tao | 713/164 |
| 2008/0184349 A1* | 7/2008 | Ting | 726/7 |

OTHER PUBLICATIONS

Boydstun, Ken, Security Framework Bridge, Filing Date—Oct. 31, 2002, U.S. Appl. No. 10/284,680, Specifiaiton (45 pgs.), Drawings (3 sheets).

Boydstun, Kenneth C., et al., Business-to-Business Security Integration, Filing Date—Jul. 31, 2003, U.S. Appl. No. 10/631,984, Specification (29 pgs.), Drawings (3 sheets).

Balasubramanian, Balagurunathan, et al., Call Center Dashborad, Filing Date—Oct. 7, 2004, U.S. Appl. No. 10/960,535, Specificaiton (42 pgs.), Drawings (13 sheets).

Himawan, Rudi, et al., Single Sign-On System and Method, Filing Date—Nov. 22, 2004, U.S. Appl. No. 10/994,997, Specification (33 pgs.), Drawings 3 sheets).

Allababidi, Mouaz, et al., "Integrated User Profile Administration Tool", filed Apr. 13, 2006, U.S. Appl. No. 11/403,619.

Office Action dated Apr. 25, 2008; U.S. Appl. No. 10/960,535, filed Oct. 7, 2004.

Final Office Action dated Oct. 10, 2008; U.S. Appl. No. 10/960,535, filed Oct. 7, 2004.

Office Action dated Jan. 9, 2009; U.S. Appl. No. 10/960,535, filed Oct. 7, 2004.

Office Action dated Apr. 29, 2009; U.S. Appl. No. 10/960,535, filed Oct. 7, 2004.

Notice of Allowance dated Sep. 25, 2009; U.S. Appl. No. 10/960,535, filed Oct. 7, 2004.

Office Action dated Apr. 14, 2008; U.S Appl. No. 10/994,997, filed Nov. 22, 2004.

Notice of Allowance and Fee(s) Due dated Oct. 23, 2008, U.S. Appl. No. 10/994,997, filed Nov. 22, 2004.

Office Action dated Mar. 17, 2008, U.S. Appl. No. 11/403,619, filed Apr. 13, 2006.

Final Office Action dated Oct. 6, 2008, U.S. Appl. No. 11/403,619, filed Apr. 13, 2006.

Office Action dated Dec. 31, 2008, U.S. Appl. No. 11/403,619, filed Apr. 13, 2006.

Office Action dated Jun. 9, 2009, U.S. Appl. No. 11/403,619, filed Apr. 13, 2006.

Final Office Action dated Jan. 6, 2010, U.S. Appl. No. 11/403,619, filed Apr. 13, 2006.

Advisory Action dated Mar. 23, 2010, U.S. Appl. No. 11/403,619, filed Apr. 13, 2006.

Microsoft, Digital Dashboard Business Process Assessment Guide White Paper, May 2000, 17 pages.

Pashalidis, Andreas et al., A Taxonomy of Single Sign-on Systems, Information Security and Privacy, 2003, 16 pages.

Office Action dated Jul. 22, 2010, U.S. Appl. No. 11/403,619, filed Apr. 13, 2006.

Final Office Action dated Jan. 6, 2011; U.S. Appl. No. 11/403,619, filed Apr. 13, 2006.

Advisory Action dated Mar. 15, 2011, U.S. Appl. No. 11/403,619, filed Apr. 13, 2006.

* cited by examiner

FRAUD DETECTION SYSTEM AND METHOD

CROSS-REFERENCE TO RELATED APPLICATIONS

This application includes subject matter related to U.S. patent application Ser. No. 10/960,535, filed Oct. 7, 2004, entitled "Call Center Dashboard", by B. Balasubramanian, et al, and U.S. patent application Ser. No. 10/994,997, filed Nov. 22, 2004, entitled "Single Sign-On System and Method", by R. Himawan, et al, both of which are incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Employees in a business may use an automated sign-on system in order to access multiple computer programs or applications during the course of performing their job in a corporate setting. Such a system may contain information regarding the passwords, authorization levels, and applications that a user may be permitted to access. This information may be contained in a single location or across a variety of relational databases.

The security of the system is based in part upon the integrity of the various application IDs and application passwords. The need to access a particular application may result in password sharing or duplication among the users. A team lead or the group supervisor may also provide their application ID and application password to a user in order to verify the functionality of the system or to provide access for a single use of an application for a user.

SUMMARY

In one embodiment, a computer system is provided that includes a call center dashboard system comprising a call center application storing two or more user profiles of two or more corresponding call center dashboard users. Each user profile comprises a system ID, a system password, and one or more application IDs and corresponding application passwords. The computer system includes a fraud detection interface that includes a duplicate application ID section that prepares an unauthorized activity error report when a submitted application ID has one or more duplicate application IDs associated with the selected application. The submitted application ID is for a selected application for a selected call center dashboard user of the two or more call center dashboard users. The fraud detection interface also includes a password criteria section verifying a validity of a submitted application password by comparing the submitted application password with a password criteria of the selected application. When the submitted application is not valid, a new submitted application password is submitted to replace the submitted application password. The fraud detection interface also includes a storage section storing the submitted application ID and the submitted application password in a user profile of the selected call center dashboard user when the submitted application ID is not a team leader application ID, the submitted application ID is not duplicated, and the submitted application password is valid. When the submitted application ID is not the team leader application ID, the submitted application ID is not duplicated, and the submitted application password is valid, the selected application is launched through the call center dashboard system.

In another embodiment, a computer implemented method is provided for detecting potential fraud when resetting an application password. The method includes providing a computer system including a call center dashboard system with a call center data store. The method provides for storing at least two user profiles of at least two call center dashboard users, wherein each user profile contains a system ID, a system password, and at least one application ID, and a corresponding application passwords. The method also includes choosing self-registration of a selected application by a selected call center dashboard user from the at least two call center dashboard users. The method provides for submitting the selected application ID for the selected application, and determining when the selected application ID is duplicated in the call center dashboard data store for the selected application. The method also includes printing an error report when the selected application ID is duplicated in the call center dashboard data store for the selected application, and submitting a selected application password for the selected application. The method further provides for determining the validity of the selected application password with regards to conforming to a password criteria of the selected application. When the previously entered selected application password fails to conform to the password criteria of the selected application, another selected application password is submitted. The selected application ID and application password is stored in the user profile of the selected call center dashboard user when the application ID is not a team leader application ID, and when the selected application ID is not duplicated, and when the selected application password conforms to the password criteria of the selected application. The selected application is launched when the selected application ID is not duplicated and when the selected application password conforms to the password criteria of the selected application.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

Employees working in call centers may employ many applications in the course of receiving and responding to customer calls. Call center employees may be required to remember many different passwords to access all of the applications. With passwords being changed periodically and with application password criteria requiring mixed character strings, it will be readily appreciated that call center employees might find it difficult to remember all of the passwords to the applications that they use. One way of coping with this difficulty is to use a single sign-on system, such as a call center dashboard (CCDB), as described in the patent applications that are incorporated herein by reference above, which enables a user to sign-on to all or some of their applications with a single sign-on procedure. While this provides one example of a single sign-on system, other single sign-on systems are known in the art and equally fall within the term CCDB as used herein.

The security of the CCDB system and application data may involve the maintenance of the integrity of the individual application IDs and the corresponding application passwords. These application IDs and application passwords may be stored at a central database. However, with any large corporate systems, there may instances in which users intentionally or unintentionally share passwords. In addition, a team leader or group supervisor may be called on to log a user into an application using the supervisor's personal application ID and password. For example, this may be to check the functionality of the CCDB system in accessing the application or it may be to allow the user to access the application for a single job related use.

The Fraud Detection Interface (FDI) allows the CCDB system to maintain the integrity of the various application Ds and application passwords. In addition, the FDI can allow the team leader or group supervisor to check the application functionality or provide a single use access to an application without comprising their own application IDs and application passwords.

Figure 1:
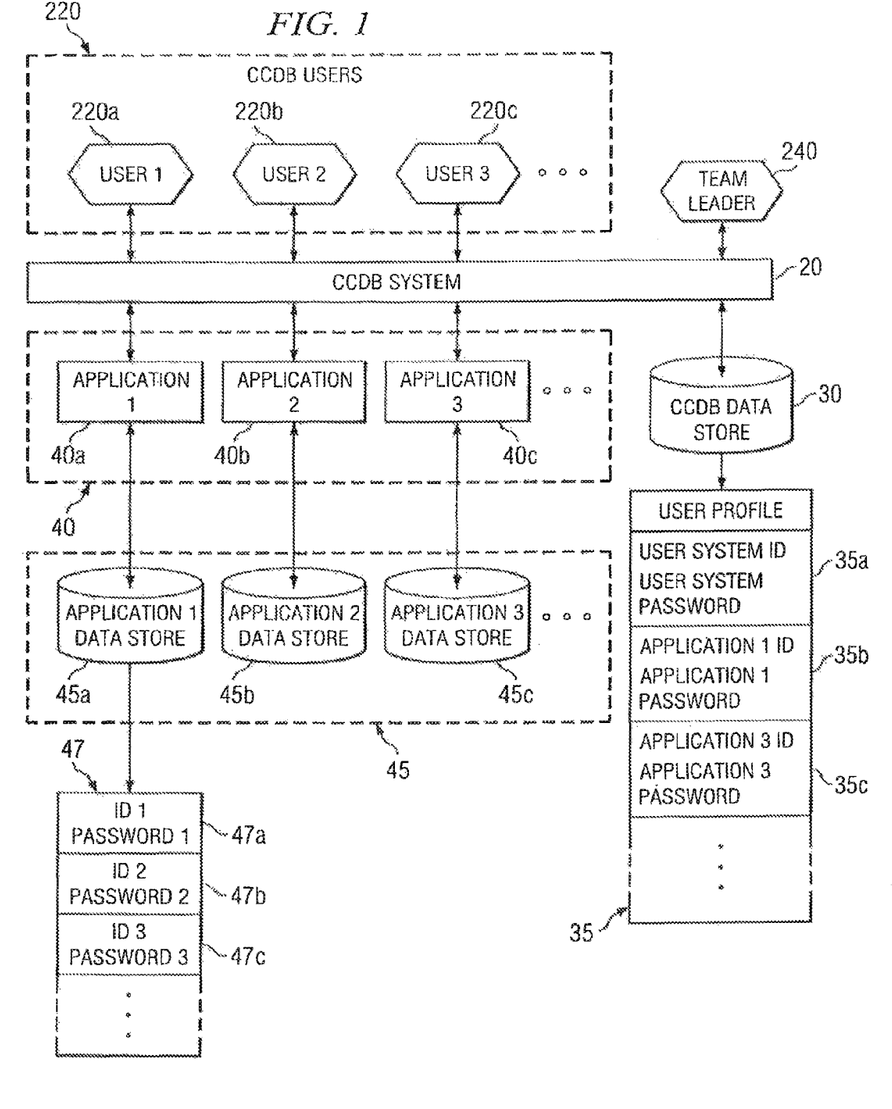
FIG. 1 is a block diagram of a call center dashboard showing information storage locations in accordance with one embodiment of the present disclosure.

FIG. 1 is a block diagram illustrating a simplified version of a call center dashboard (CCDB). As shown in FIG. 1, CCDB users 220 (only three CCDB users are shown in this figure, but other numbers of users may be present) and team leader 240 access applications 40 (only three applications are shown in this figure, but other numbers may be present) via the CCDB system 20. CCDB users 220 may log on to one or more of the applications 40 through the use of a single system ID and system password.

The CCDB system 20 maintains a CCDB data store 30 holding various user profiles 35 corresponding to each of the CCDB users 220. Each of the user profiles 35 may contain information related to the authorization and authentication of the corresponding CCDB user 220 with a particular application 40. For example, authentication information or credentials may include the system ID and system password 35*a*, the first application ID and first application password 35*b*, and third application ID and third application password 35*c*. In addition, authorization information (not shown in this figure) relating to the level of data access or modification abilities of a user corresponding to a particular application 40 or other information may also be included in the user profile 35.

Each of the applications 40 may have an associated application data store 45. For example, the first application 40*a* maintains the first application data store 45*a*. The information contained within the data stores 45 may be the authentication and authorization information for the appropriate application 40. For example, the first application data store 45 contains the first application authentication information 47 for various users of the first application 40*a* (authorization information is not shown in this figure).

The first application authentication information 47 may contain the application IDs and application passwords allowing access to the first application 40*a*. For example, the first application data store 45*a* shows three users of the first application 40*a*, ID 1 and password 1 47*a*, ID 2 and password 2 47*b*, and ID 3 and password 3 47*c*.

In order to access the first application, a CCDB user 220, such as user 1 220*a*, initially signs-on to the CCDB system 20 using their system ID and system password 35*a*. The CCDB system retrieves the user profile 35 from the CCDB data store 30 corresponding to the system ID and system password 35*a* input by the user 1 220*a*. The CCDB system 20 then logs on to various applications 40 using a keyboard script or by other methods. The CCDB system 20 maintains a record in the user profile 35 of the ID and password 47 used to authenticate user 1 220*a* for the first application 40*a*.

Figure 2:
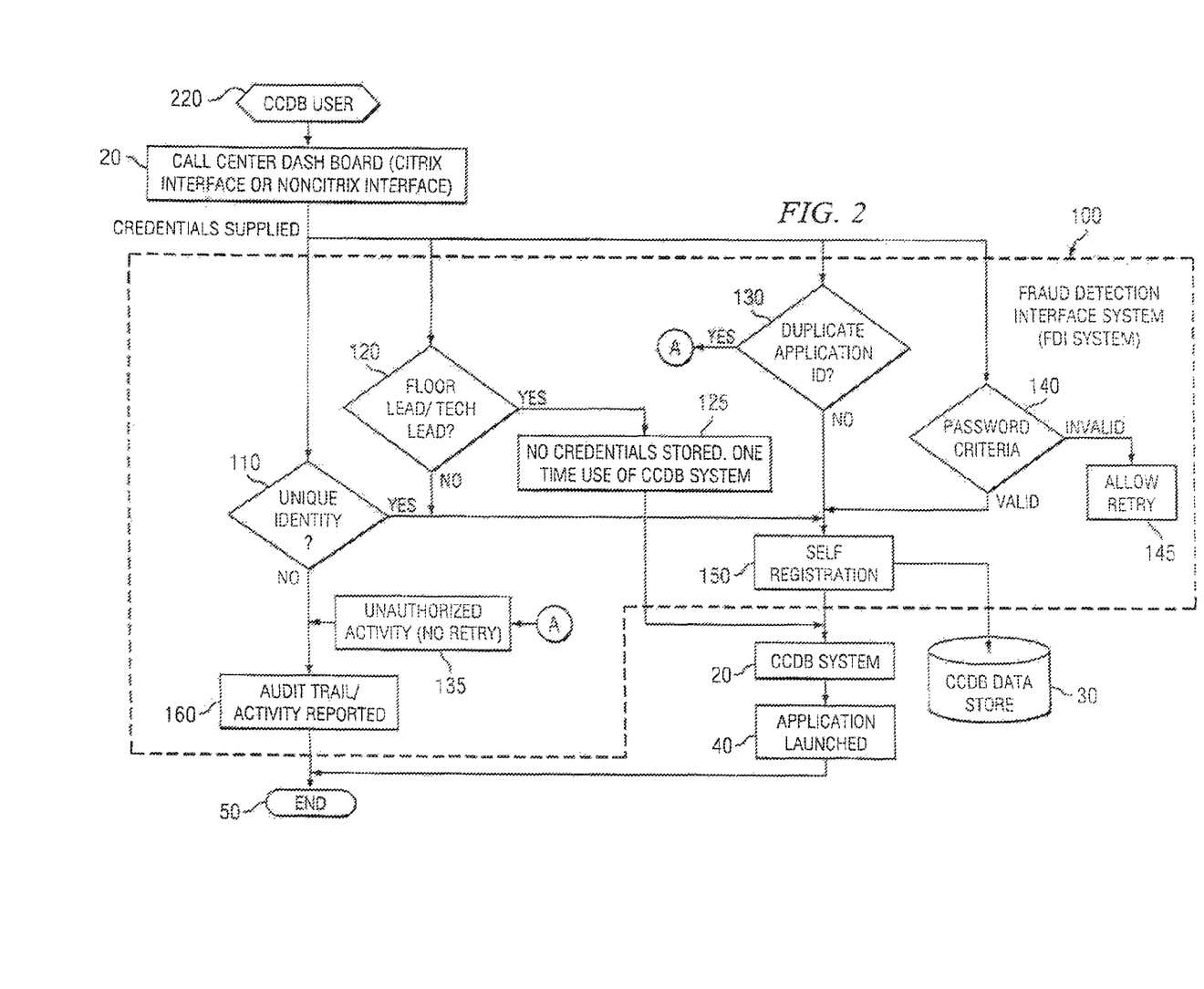
FIG. 2 is a block diagram of a system including a call center dashboard and a fraud detection system in accordance with one embodiment of the present disclosure.

Fraud detection takes place when a CCDB user 220 attempts self-registration for an application 40 or when the CCDB system 20 resets the CCDB user's 220 application password. FIG. 2 is a simplified block diagram of a system incorporating a CCDB system 20 and a Fraud Detection Interface 100 (FDI 100). In FIG. 2, a CCDB user 220 initially signs-on to the CCDB system 20 using a system ID and a system password 35*a* for example. The CCDB user 220 may require access to an application 40 not currently within their user profile 35. In this situation, the CCDB user 220 may wish to self-register with the application 40.

In self-registration, the credentials of the user are supplied to the FDI 100. These credentials may include the system ID of the CCDB user 220, an application ID, and an application password for the required application 40. The FDI 100 checks the system ID of the CCDB user 220 with the other system IDs stored in the CCDB data store 30 to ensure that the system ID is unique 110.

If additional system IDs in the CCDB data store 30 match the system ID of the CCDB user 220, such as when the entered ID is already in use, then the unique identity check 110 of the FDI 100 prepares an audit trail/activity error report 160 and ends 50 the self-registration session. If the system ID of the CCDB user 220 is unique, then the FDI 100 reviews the application ID supplied by the CCDB user 220.

In some cases, a team leader 240 or floor supervisor may want to provide access to an application 40 for a CCDB user 220 for a single work session. In other cases, a CCDB user 220 may have previously established an application ID and an application password for an application 40, but for some reason is denied access to the application 40 through the CCDB system 20. In at least these cases, the team leader 240 may wish to log the CCDB user 220 onto the application 40 without storing the team leader's 240 application ID and application password in the CCDB user's 220 user profile 35.

In order to accomplish the above, the FDI 100 checks the supplied application ID 120 to determine if the application ID belongs to a team leader 240. If the application ID is determined to belong to a team leader 240, then the FDI 100 allows a single use of the application 40 by the CCDB user 220 after further authentication by the team leader 240, such as supplying the application password of team leader 240.

In a CCDB system 20, there may be an automated password resetting and generation function. In which case, the team leader 240 may be unaware of their application password. For example using a CCDB system 20, the team leader 240 may only need to know one password, which is used by the CCDB system 20 to authenticate the team leader 240 and enable access to multiple different applications. The CCDB system 20 automatically generates and manages the passwords and login for each of the different applications without any input by the team leader 240. Thus the team leader 240 would likely know the password to log into the CCDB system 20, but might not know any of the passwords/usernames to access the individual applications. The other instance when this might occur is when the CCDB system 20 resets the team leader's 240 password for some reason. In either case, a pop-up window, for example, might request further information such as the team leader's 240 system ID and system password, and then the FDI 100 may retrieve and display the team leader's 240 current application password.

The user 220 is then allowed to launch the application 40 via the CCDB system 20. However, the team leader's 240 application ID and application password will not be stored in the CCDB user's 220 user profile 35. When the CCBD user 220 exits the application 40, they will not be able to re-launch the application 40 without going through the self-registration procedure again.

If the application ID is not from a team leader 240, the FDI 100 checks to determine if the supplied application ID is duplicated 130 in the CCDB data store 30. For example, all of the first application IDs for the first application 40a are compared with the supplied application ID. If a match is found between the first application IDs and the supplied application ID, the duplicate application ID section 130 of the FDI 100 determines that unauthorized activity has been attempted 135. The FDI 100 then prepares an unauthorized activity report 160 and does not allow the CCDB user 220 to re-enter a supplied application ID. The self-registration session ends 50.

If the supplied application ID is not a team leader application ID or does not otherwise already exist in the CCDB data store 30, the supplied application password is reviewed 140. Each application 40 may have their own password criteria dictating the form and format of a password (e.g., at least eight characters long with two numeric characters). The CCDB system 20 may maintain password criteria corresponding to the individual applications 40. This would allow the CCDB system 20 to reset an application password in the format required by the application 40, instead of requiring costly and time consuming modifications of the individual applications 40 to accept a single password criteria.

If the supplied password does not coincide with the password criteria for the application 40, the CCDB user 220 is given an opportunity to re-enter a new password in the correct format. Once a valid password is provided by the CCDB user 220, the CCDB user 220 is able to complete self-registration with the application 40. The supplied credentials, in this case the application ID and application password, are then stored in the CCDB user's 220 user profile 35 located in the CCDB data store 30.

After storing the supplied credentials in the CCDB data store 30, the CCDB user 220 launches the application 40 via the CCDB system 20. From this point forward, the CCDB system 20 may perform password resetting and maintenance independently of the CCDB user 220.

Figure 3:
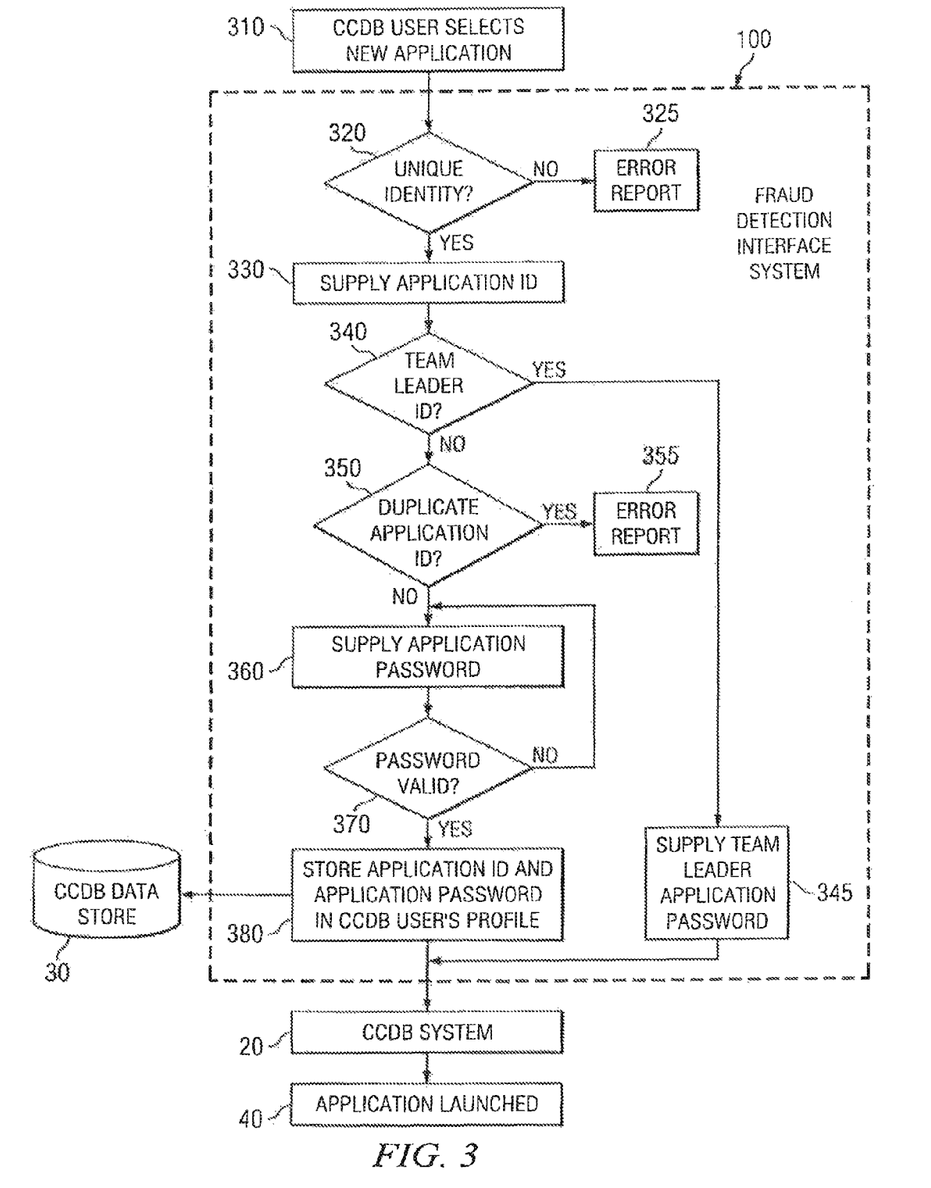
FIG. 3 is a flow diagram of a self-registration function with a fraud detection system in accordance with one embodiment of the present disclosure.

FIG. 3 is a flow-chart showing the self-registration of a CCDB user 220 with a CCDB application 40 with an embodiment of the current invention. In the first block 310, the CCDB user 220 selects an application 40 for self-registration. Alternatively, the CCDB user 220 may already be registered with the application 40 but due to error or some other reason, temporarily unable to open and log on to the application 40. In addition, the CCDB user 220 may be performing a function that requires temporary access to an application 40. Once the application 40 is selected, at block 320 the FDI 100 checks the system ID of the CCDB user 220 to ensure that the system ID is unique. The system ID of the CCDB user 220 is compared to the other stored system ID's located in the CCDB data store 30. If the system ID is not unique, the FDI 100 prepares an error report 325 describing the situation and ending the self-registration process.

If the system ID is unique, the CCDB user 220 supplies an application ID in block 330 for the self-registration application 40. The application ID may be the same as the system ID of the CCDB user 220. The FDI 100 determines if the application ID matches a previously stored application ID of a team leader 240 or floor lead in block 340. As described earlier, the team leader 240 may be performing a check on the CCDB system 20 of the CCDB user 220 to ensure that the application 40 can be launched within the CCDB system 20. Alternatively, the team leader 240 may be granting a limited single use of the application 40 to the CCDB user 220.

If the application ID is that of a team leader 240, the FDI 100 then requires a CCDB user 220 to submit the team leader's 240 application password in block 345. Since the CCDB system 20 may be responsible for resetting and maintaining the application password of the team leader 240, the team leader 240 may not be aware of the current application password. In order to manage this type of situation, the FDI 100 may provide the application password to the CCDB user 220. This may occur after further authentication (not shown) such as requesting the system ID and the system password of the team leader 240 prior to displaying the team leader's 240 application password.

Once the CCDB user 220 has entered the team leader's 240 application ID and application password, the FDI launches the application 40 via the CCDB system 20. The application ID and application password is not stored in the user profile 35 of the CCDB user 220.

However, if the application ID is not a team leader's 240 application ID, then in block 350 the FDI 100 checks in order to determine if the application 40 has duplicate application IDs stored in the CCDB data store 30. If a duplicate application ID is found, then the FDI 100 prepares an unauthorized activity report in block 355. If no duplicate application IDs are found in block 350, then the CCDB user 220 supplies an application password in block 360.

The application password supplied in block 360 must conform to the password criteria of the application 40 selected for self-registration. In order to ensure the validity of the application password, in block 370 the FDI 100 compares the application password supplied in block 360 to the application criteria of the application 40 selected for self-registration. If the application password does not conform to the password criteria of the application 40, the CCDB user 220 is given an opportunity to re-enter an application password in block 360. The re-entered application password of block 360 is subjected to another validation test 370.

When a valid or conforming application password has been supplied, the FDI 100 allows the self-registration of the CCDB user 220. In block 380 of the self-registration of the CCDB user 220, the application ID and the application password is stored in the user profile 35 of the CCDB user's 220. The user profile 35 may be stored in the CCDB data store 30. The storing of the application ID and application password will allow the CCDB system 20 to automatically log on to the self-registration application 40 when the CCDB user 220 signs on to the CCDB system 20 in future sessions. After storing the application ID and the application password in the user profile 35 of the CCDB user 220, the self-registration application 40 launches.

Figure 4:
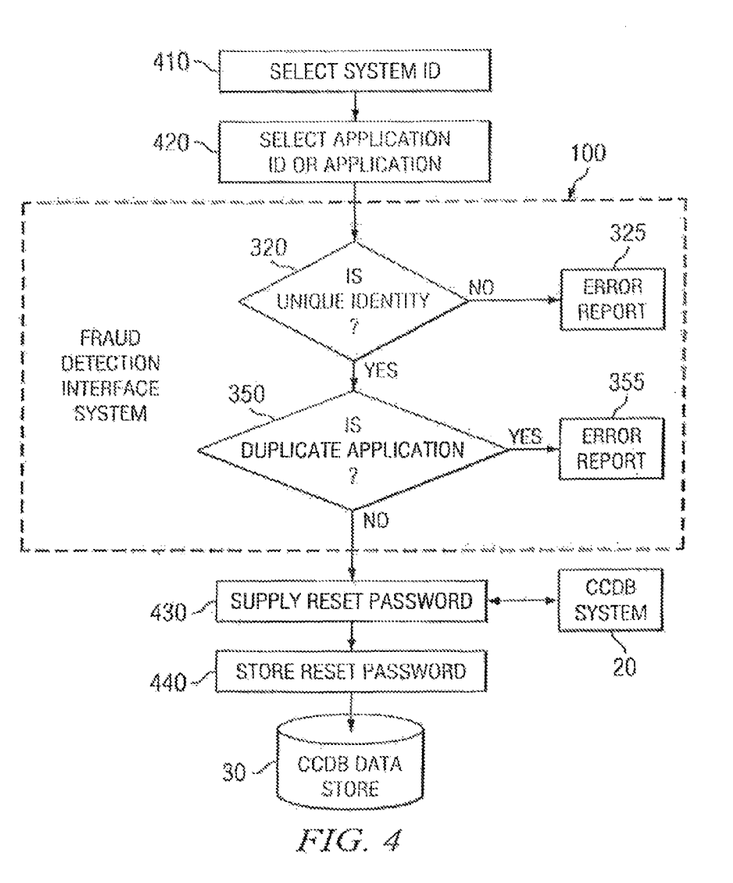
FIG. 4 is a flow diagram of a password resetting function with a fraud detection system in accordance with one embodiment of the present disclosure.

FIG. 4 a flow-chart illustrates resetting an application password of a CCDB user 220 for a CCDB application 40 with an embodiment of the current invention. In order to reset an application password, the system ID corresponding to the application password is selected in block 410. The system ID can be selected via an automated selection, as in the case of periodic resetting of application passwords as required by an application 40, or a manual selection as in the case of a system administrator acting on behalf of a request to reset a particular application password associated with a system ID. After selection of the system ID in block 410, an application ID associated with the system ID is selected in block 420.

A user 220 may have multiple application IDs in their user profile 35. The application ID may be selected by identifying the application 40 associated with the application ID. In addition, the application ID may be the same as the system ID of the user 220. Selection of a particular application ID leads to identification of a corresponding application password.

The FDI 100 initially verifies that the system ID of the CCDB user 220 is unique in block 320. If the system ID of the CCDB user 220 is not unique, the FDI 100 prepares an error report in block 325. If the system ID of the CCDB user 220 is unique, then the application ID is analyzed in block 350 to determine if duplicate application IDs exist for a particular application 40.

As previously detailed, if duplicate application IDs exists for a particular application 40, then the FDI 100 prepares an error report in block 355. However, if the system ID is unique and the application ID is not duplicated in a particular application 40, the FDI 100 allows the password resetting process to proceed to block 430, in which a reset password is supplied by the CCDB system 20.

The reset password can be supplied using the password criteria associated with a particular application 40. The password criteria allows the CCDB system 20 to create a reset password corresponding to the proper format and configuration appropriate for the particular application 40. The password may be automatically supplied without any additional input required from a CCDB user.

After a reset password is supplied in block 430, the reset password is stored in block 440 in the user profile 35 of the CCDB user 220 in the CCDB data store. The storing of the reset password in block 440 allows the CCDB system 20 to automatically log the CCDB user 220 into the application 40 when the CCDB user 220 signs on to the CCDB system 20. It will be appreciated that the CCDB system 20 insulates the user(s) from the individual applications 40 and manages many, or perhaps all, aspects of password and login required for the individual applications 40. Therefore, to obtain access to a single application without going through the CCDB system 20 may be difficult. Also, there are many the potential security risks when these passwords become know. Therefore the present system is operable, when using a CCDB system 20, for obtaining the passwords to access the individual applications, as well as resetting the passwords in a manner that maintains security and prevents potential fraud by checking, for example, for duplicate application IDs.

Figure 5:
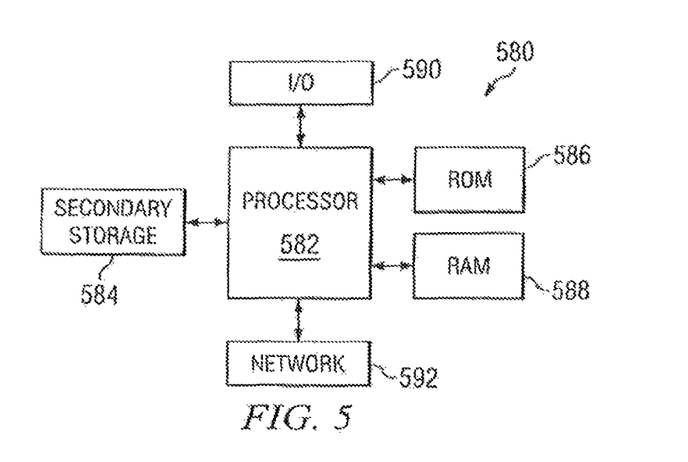
FIG. 5 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 5 illustrates a typical, general-purpose computer system suitable for implementing one or more embodiments disclosed herein. The computer system 580 includes a processor 582 (which may be referred to as a central processor unit or CPU) that is in communication with memory devices including secondary storage 584, read only memory (ROM) 586, random access memory (RAM) 588, input/output (I/O) 590 devices, and network connectivity devices 592. The processor may be implemented as one or more CPU chips.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage. The RAM 588 is used to store volatile data and perhaps to store instructions. Access to both ROM 586 and RAM 588 is typically faster than to secondary storage 584.

I/O 590 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 592 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 592 devices may enable the processor 582 to communicate with an Internet or one or more intranets. With such a network connection, it is contemplated that the processor 582 might receive information from the network, or might output information to the network in the course of performing the above-described method steps or blocks. Such information, which is often represented as a sequence of instructions to be executed using processor 582, may be received from and outputted to the network, for example, in the form of a computer data signal embodied in a carrier wave Such information, which may include data or instructions to be executed using processor 582 for example, may be received from and outputted to the network, for example, in the form of a computer data baseband signal or signal embodied in a carrier wave. The baseband signal or signal embodied in the carrier wave generated by the network connectivity 592 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A computer implemented method for detecting potential fraud when resetting an application password, comprising:
    providing a computer system including a call center dashboard system with a call center dashboard data store;
    storing, in the call center dashboard data store at least two user profiles of at least two call center dashboard users that are not a team leader, wherein each user profile contains a system ID, a system password, and at least one an application user ID and an application password corresponding to at least one call center application;
    initiating the resetting of a selected the application password corresponding to a selected call center application selected from the at least one call center application for a selected call center dashboard user selected from the at least two call center dashboard users that are not a team leader;
    determining, in response to initiating the resetting of the application password corresponding to the selected call center application for the selected call center dashboard user, whether the application user ID corresponding to the selected call center application for the selected call center dashboard user is duplicated among the at least two call center dashboard users that are not a team leader in the call center dashboard data store for the selected call center application;
    preparing an error report when the application user ID corresponding to the selected call center application for the selected call center dashboard user is duplicated among the at least two call center dashboard users that are not a team leader in the call center dashboard data store for the selected call center application;
    supplying a reset application password using a password criteria of the selected call center application when the application user ID corresponding to the selected call center application for the selected call center dashboard user is not duplicated among the at least two call center dashboard users that are not a team leader in the call center dashboard data store for the selected call center application; and
    storing the reset application password in the user profile of the selected call center dashboard user when the application user ID corresponding to the selected call center application for the selected call center dashboard user is not duplicated among the at least two call center dashboard users that are not a team leader in the call center dashboard data store for the selected call center application and the reset application password conforms to the password criteria of the selected call center application.

2. The computer implemented method of claim 1, further comprising:
    determining when a selected system ID of the selected call center dashboard user is duplicated in the call center dashboard data store;
    preparing an error report when the selected system ID is duplicated in the call center dashboard data store; and
    wherein storing the reset application password is not performed when the selected system ID is duplicated in the call center dashboard data store.

3. The computer implemented method of claim 2, wherein initiating the resetting of the selected password is performed by a timing cycle of the selected application.

4. The computer implemented method of claim 2, wherein initiating the resetting of the selected password is performed by a call center dashboard system administrator.

5. The computer implemented method of claim 2, wherein supplying the reset application password is performed by a keyboard script of the call center dashboard system.

6. The computer implemented method of claim 2, wherein the error report prepared when the application user ID corresponding to the selected call center application for the selected call center dashboard user is duplicated in the call center dashboard data store further identifies instances wherein a user profile corresponding to the selected call center application has an application user ID corresponding to the selected application that is not identical to a system ID of the corresponding user profile.

7. The computer implemented method of claim 2 wherein the application user ID is the same as the selected system ID.

8. The computer implemented method of claim 1 wherein the resetting of the application password corresponding to the selected application for the selected call center dashboard user is performed without any input by the selected call center dashboard user.

9. A computer implemented method for detecting potential fraud during self-registration of an application, comprising:
    providing a computer system including a call center dashboard system with a call center dashboard data store;
    storing in the call center dashboard data store at least two user profiles of at least two call center dashboard users that are not a team leader, wherein each user profile contains a system ID, a system password, and at least one application user ID and a corresponding application password;

receiving selection for self-registration of a selected application from a first call center dashboard user of the at least two call center dashboard users that are not a team leader;

receiving a selected application user ID for the selected application in the self-registration of the selected application;

determining whether the selected application user ID is duplicated for the selected application among the at least two call center dashboard users that are not a team leader in the call center dashboard data store when the selected application user ID is not a team leader application user ID;

preparing an error report when the selected application user ID is duplicated among the at least two call center dashboard users that are not a team leader in the call center dashboard data store for the selected application;

receiving a selected application password for the selected application in the self-registration of the selected application;

determining the validity of the selected application password with regards to conforming to a password criteria of the selected application when the selected application user ID is not a team leader application user ID;

receiving another selected application password when the previously entered selected application password fails to conform to the password criteria of the selected application;

storing the selected application user ID and application password in the user profile in the call center dashboard data store for the first call center dashboard user when the selected application user ID is not a team leader application user ID, the selected application user ID is not duplicated among the at least two call center dashboard users that are not a team leader, and the selected application password conforms to the password criteria of the selected application;

launching the selected application when the selected application user ID is stored in the user profile of the first call center dashboard user; and launching the selected application for a single use when the selected application user ID is a team leader application user ID, and the selected application password is a team leader application password for the selected application.

10. The computer implemented method of claim 9, further comprising:

determining when a system ID of the first call center dashboard user is duplicated in the call center dashboard data store; and printing an error report when the system ID of the first call center dashboard user is duplicated in the call center dashboard data store;

wherein storing the application user ID and application password is not performed when the selected system ID is duplicated in the call center dashboard data store; and wherein launching the selected application is not performed when the selected system ID is duplicated in the call center dashboard data store.

11. The computer implemented method of claim 10, further comprising:

requesting the team leader application password for the selected application when the application user ID is the team leader application user ID.

12. The computer implemented method of claim 11, further comprising:

providing the team leader application password for the selected application after entry of a team leader system ID and a team leader system password, when the selected application user ID is the team leader application user ID.

13. The computer implemented method of claim 9, wherein the error report prepared when the selected application user ID is duplicated in the call center dashboard data store further identifies instances wherein a user profile corresponding to the selected application has an application user ID of the selected application that is not identical to a system ID of the corresponding user profile.

14. The computer implemented method of claim 10, wherein the submitted application user ID is the same as the system ID in the user profile of the first call center dashboard user.

15. A computer system including a call center dashboard system comprising a call center application storing two or more user profiles of two or more corresponding call center dashboard users that are not a team leader, wherein each user profile comprises a system ID, a system password, and one or more application user IDs and corresponding application passwords, and a fraud detection interface comprising:

a duplicate application user ID section that prepares an unauthorized activity error report when a submitted application user ID is not a team leader application user ID and the submitted application user ID, provided for self-registration with a selected application for a first call center dashboard user of the two or more call center dashboard users that are not a team leader, has one or more duplicate application user IDs associated with the selected application among the two or more call center dashboard users that are not a team leader;

a password criteria section that verifies a validity of a submitted application password when the submitted application user ID is not a team leader user ID, the submitted application password provided for self-registration with the selected application, the validity of the submitted application password verified by comparing the submitted application password with a password criteria of the selected application, wherein when the submitted application is not valid, a new submitted application password is received to replace the submitted application password; and a storage section that stores the submitted application user ID and the submitted application password in a user profile of the first call center dashboard user when the submitted application user ID is not a team leader application user ID, the submitted application user ID is not duplicated, and the submitted application password is valid, and wherein when the submitted application user ID is stored, the selected application is launched through the call center dashboard system.

16. The fraud detection interface as in claim 15, further comprising:

a unique identity section that prepares an audit error report when a system ID of the first call center dashboard user has a duplicate system ID in the call center data store; and wherein the storage section will not store the application user ID and the application password when the system ID is duplicated in the call center data store.

17. The fraud detection interface as in claim 16, further comprising:

a team leader identification section that requests a team leader application password for the selected application when the submitted application user ID is a team leader application user ID; and wherein the selected application is launched for a single use without storing the team leader application user ID and the team leader application password in the user profile of the first call center dashboard user.

18. The fraud detection interface as in claim 15 wherein the unauthorized activity report further identifies instances wherein a user profile corresponding to the selected application has an application user ID of the selected application that is not identical to a system ID of the corresponding user profile.

19. The fraud detection interface as in claim 17, further comprising:

a team leader security section that requests a team leader system ID and a team leader system password prior to providing the team leader application password for the selected application when the submitted application user ID is the team leader application user ID.

20. The fraud detection interface as in claim 15 wherein the submitted application user ID is the same as the system ID of the first call center user.

* * * * *